United States Patent [19]

Barzilai et al.

[11] Patent Number: 5,063,562
[45] Date of Patent: Nov. 5, 1991

[54] FLOW CONTROL FOR HIGH SPEED NETWORKS

[75] Inventors: Tsipora P. Barzilai, Millwood; Mon-Song Chen, Katonah; Bharath K. Kadaba, Peekskill; Marc A. Kaplan, Purdys, all of N.Y.

[73] Assignee: International Business Machines Corporation, Armonk, N.Y.

[21] Appl. No.: 527,609

[22] Filed: May 23, 1990

[51] Int. Cl.⁵ .............................. H04J 3/24; H04J 3/16
[52] U.S. Cl. ..................................... 370/94.1; 370/79; 370/82
[58] Field of Search .................... 370/82, 83, 84, 94.1, 370/94.2, 94.3, 89, 79, 95.1, 95.2, 95.3, 85.8, 85.7, 29, 24

[56] References Cited

U.S. PATENT DOCUMENTS

4,736,369 4/1988 Barzilai et al. ..................... 370/94.1

Primary Examiner—Douglas W. Olms
Assistant Examiner—Wellington Chin
Attorney, Agent, or Firm—Douglas W. Cameron

[57] ABSTRACT

A method and apparatus for dynamically adjusting the window size in a session between a sender and a receiver over a link of a packet transmission network. This invention discloses a dynamic window adjustment scheme to determine the optimum window size with a minimum number of iterations. This invention also covers a method and apparatus for sharing pacing credits among a number of sessions during which packets are transmitted over the network. With this invention sessions having no packets to transmit will send pacing credits to a shared credit pool while pacing credits will be distributed to those session having packets to transmit.

15 Claims, 7 Drawing Sheets

FLOW CONTROL FOR HIGH SPEED NETWORKS

TECHNICAL FIELD

This invention generally relates to a method of dynamically adjusting the window size in a session between a sender and a receiver over a link of a packet transmission network. More specifically this invention describes a method of adjusting a window size with a minimum number of iterations. This invention also describes a method of sharing pacing credits among a number of sessions during which packets are to be transmitted over a packet transmission network.

DESCRIPTION OF THE PRIOR ART

Flow control is the function that controls the entry and delivery of packets across computer networks. Its goals are to achieve high utilization of network resources- link bandwidths and node intelligence, to prevent deadlock, and to be fair to users. Window pacing, between a sender of data and the corresponding receiver in the network, is often the key element in achieving these goals. A window is related to the number of outstanding packets that have been transmitted but not acknowledged yet. SNA uses a window pacing mechanism, referred to herein as the "basic PRQ/PRS" scheme, which will be improved upon by this disclosure.

The "basic PRQ/PRS" scheme is shown in [1] to have comparable or better performance than other pacing mechanisms. In a PRQ/PRS scheme, the sender requests more pacing credits (permissions to transmit packets) at the beginning of every window, and the receiver grants a new window of pacing credits only after it has processed all packets preceding, including the packet containing the pacing request.

This protocol is performed via the exchange of two control messages- the pacing request (PRQ) and the pacing response (PRS). The key property of a PRQ/PRS scheme is that, at any time, the sender never has more than two windows of pacing credits and the receiver never has more than two windows of packets to enqueue.

Pacing can be done in two ways: one is the "end to end" way in which only the source and destination nodes are involved in pacing, and the other is the "hop by hop" way in which every node is involved in pacing of packets entering or leaving a node. Between the two, the hop by hop approach is more robust [2] in two aspects:

In "hop by hop" flow control, nodes adjacent to a potential congested spot can react quickly and throttle transmissions to either eliminate or alleviate the problem. The throttling is much more responsive this way than in an "end to end" flow control scheme which requires a long delay (roughly proportional to end to end round trip delay) to react to "congestion" within a network.

In hop by hop flow control, the idiosyncrasies of a link (such as the long propagation delay of a satellite link) can be isolated to the local hop. This "link isolation" property makes network design much easier. For example, we will see below that, in a network with hop by hop flow control, the buffer requirements of a node depend only on the attached links, not on the entire paths of the virtual circuits that pass through the node.

There are two ways of dealing with deadlock problems. One way is to drop packets upon congestion and retransmit them at later times. This approach can solve the deadlock problem, but it is liable to "livelock," i.e., persistent repetitions of retransmissions. Also, with this approach packet drops may occur in such a way that effective throughput becomes zero [2]. Although possible, tuning a drop-packet pacing mechanism to meet certain livelock probability criterion is a major effort. Therefore, from our view, a drop-packet pacing scheme is not desirable because it is too environment dependent and not robust enough.

The other approach is to pre-allocate buffers when pacing credits are granted. Since there is a receiving buffer pre-allocated for each legitimately transmitted packet, packets need never be dropped. A specific class of schemes that adopt this policy are the buffer class (BC) schemes [3]. In a BC scheme, packets and buffers are grouped into classes. Packets of the same clase share a pool of buffers. Several buffer classifications have been proposed: session based [4-5], path based [6], and hop count [7]. Buffer class schemes are very desirable because they probably can be deadlock and livelock free.

To allow efficient use of buffer resources and to limit packet delays through a network, it is not desirable to fix the window sizes of a hop-by-hop buffer class pacing scheme. An adaptive window pacing scheme is presented in U.S. Pat. No. 4,736,369 to Barzilai et al. for a session based (one type of buffer classification) hop-by-hop flow control mechanism. This adaptive window scheme is designed to reduce the windows of congested sessions and increase the windows of active and uncongested sessions. Statuses of sessions are based on the queue lengths at both the senders and the receivers. A congested session has a queue at its receiver that is longer than a certain threshold; an inactive session has an empty queue at its sender. During each adjustment, window sizes are either increased or decreased by one. The receiver is allowed to send an isolated control packet to the sender to claim excess pacing credits from a specified session.

The throughput of the PRQ/PRS scheme depends critically on the proper setting of window sizes. The concept of "keeping the pipe full" is recognized in several queueing studies such as [8]. In [6] it is shown that window sizes need not be greater than $W_{max}$ which is given by $W_{max} = 3 + ((\text{link speed in packets per second}) \times (\text{round trip delay in seconds}))$. The range of window sizes, i.e., from 1 to $W_{max}$ increases with the product of link speed and link propagation time. Clearly, the larger the window range, the more difficult the window adjustment. For example, the adaptive scheme in U.S. Pat. No. 4,736,369 to Barzilai, which changes windows by fixed increments is effective in low speed environment, but not in high speed environments. It is not acceptable, for example, to wait for 50 iterations for a window size to converge from 100 to 50.

The above scheme is shown to be effective when window ranges are small (1-10) such as in low speed environments. In high speed networks where window ranges are large (1-200), the scheme is inefficient because: a) the fixed value use for window size adjustment is not responsive enough, and b) there is much overhead in the process of claiming "excess" pacing credits- one packet per claim per session.

U.S. Pat. No. 4,727,537 to Nichols describes a scheme for handling flow control within a STARLAN type controller. The Nichols patent describes a jamming signal, which results in inhibiting the transmission of data from any associated transmitting and receiving devices.

U.S. Pat. No. 4,616,359 to Fontenot discloses a flow control scheme for data packets through a packet switching network by the use of an adaptive preferential permit packet. This permit packet is sent node to node prior to a transmission of a bulk of data packets. The node discards the permit packet if the number of packets awaiting transmission from that node exceeds a prescribed threshold. Fontenot also discloses a time-out mechanism wherein a permit packet is resent from an originating port if a permit return packet is not received within a predetermined time.

U.S. Pat. No. 4,677,616 to Franklin discloses a flow control scheme for bus-like local area networks, e.g., data kit. Franklin's scheme requires the existence of a central system controller which monitors buffer occupancy in every transmitting/receiving terminal and adjusts window sizes of calls. This window scheme is semi-fixed because the window size of a call remains the same until either there are new call setups or existing calls terminate.

U.S. Pat. No. 4,630,264 to Wah et al discloses a contention resolution protocol on a single shared bus with asynchronous time division multiplexing. If more than one station contends for, or if no station contends for, a window adjustment rule is applied at each station to change the window size. Contention is resolved by generating a random number for each contending station at the beginning of a contention period, and by successively modifying the window until exactly one station's number is isolated in the window, contention is resolved. Once contention is resolved a packet can be transmitted.

REFERENCES

1. M. Schwartz, "Performance analysis of SNA virtual route pacing control," IEEE Trans. Commun., Jan. 1982.
2. M-S. Chen and B. Kadaba, "A Class of efficient flow control schemes for computer networks," IBM Research Report, RC12091, August 1986.
3. A. Giessler, A. Jagemann, E. Maser, and J. Hanle, "Flow control based on buffer classes," IEEE Trans. on Commun., vol. COM-29, no. 4, 1981.
4. A. Baratz, J. Gray, P. Green, J. Jaffe, and D. Pozefsky, "SNA networks of small systems," IEEE JSAC, vol. SAC-3, No. 3, May 1985.
5. L. Tymes, "Routing and flow control in TYMNET," IEEE Trans. Commun., vol. COM-29, No. 4, April 1981.
6. M-S. Chen, B. Kadaba, and G. Grover, "Efficient hop by hop buffer class flow control schemes," in Proc. GLOBECOM'87, Tokyo, Japan, 1987.
7. A. Giessler, J. Haenle, A. Koenig, and E. Pade, "Packet networks with deadlock-free buffer allocation- An investigation by simulation," GMD reprt, Darmstadt, Germany, 1976.
8. K. Bharath-Kumar and J. Jaffe, "A new approach to performance oriented flow control," IEEE Trans. Commun., vol. COM-29, No. 4, April 1981.

SUMMARY OF THE INVENTION

It is, therefore, an object of this invention to dynamically adjust the window size in a packet transmission network using a minimum number of iterations to arrive at the desired window size.

It is also an object of this invention to provide a method and apparatus for sharing pacing credits among a plurality of sessions during which packets are transmitted over a packet transmission network.

Accordingly, this invention provides a method and apparatus for adjusting the window size in a session between a sender and receiver on a link of a packet transmission network. With this invention, a pacing response is transmitted to the sender indicating the size of a subsequent window to be transmitted in a session between the sender and the receiver. The size of the subsequent window is the number of packets that the sender can transmit in the subsequent window. The subsequent window size is determined by decreasing a previous window size if either of two conditions are satisfied. The first condition is that $QL \neq 0$ where QL is the number of packets stored in a queue of the receiver for future transmission to another node of the network. The alternative condition is having $QL=0$ after a pacing request was not received in a specified time interval. If either one of the above two conditions is satisfied, then the window size is determined according to the following formula: $WS = \text{Max}(W_{min}, CNT - QL + B)$. CNT or count is the number of packets received by the receiver from the sender during a round trip delay, and $W_{min}$ is a prespecified parameter denoting a minimum window size. B is also a prespecified parameter. The round trip delay is the time needed for a first packet to be transmitted from the sender to the receiver plus the time needed for a second packet to be transmitted from the receiver to the sender after the first packet is received by the receiver. If when the subsequent window size is to be calculated, $QL=0$ and a pacing request was received in the specified time interval, then the subsequent window size is determined by increasing a previous window size with the subsequent window size assuming a value between CNT and $W_{max}$ where $W_{max}$ is a prespecified parameter.

Accordingly, this invention also provides a method and apparatus for sharing pacing credits among selected sessions during which packets are to be transmitted. To share these pacing credits, sessions are polled to determine if a send queue corresponding to each session has packets stored for future transmission. If, when a session is polled, there are no packets stored in a corresponding queue for transmission, then at least one pacing credit will be stored in the shared credit pool. The pacing credits are distributed from the shared credit pool to those of the sessions whose corresponding send queues have packets stored for transmission.

DESCRIPTION OF THE PREFERRED EMBODIMENT

Dynamic Window Adjustment

First, the window adjustment process for an arbitrary hop of an arbitrary session within a network is described. This same process is to be applied at every hop of every session in the network. The term hop refers to two adjacent nodes and the facilities connecting these nodes.

Figure 1:
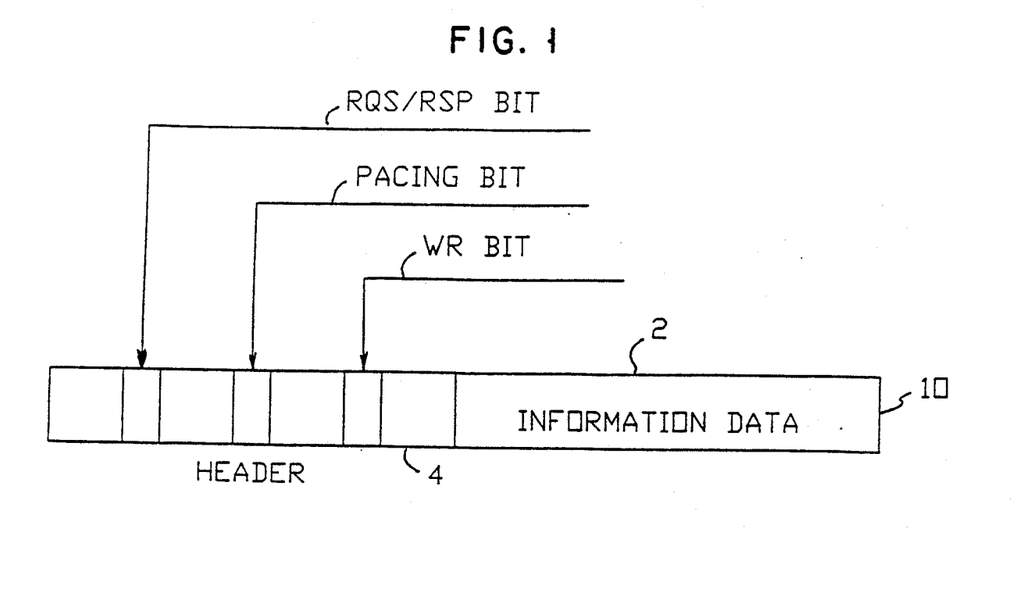
FIG. 1 schematically illustrates a packet with a RQS (request)/RSP (response) bit, a pacing bit and a WR (window received) bit.

As shown in FIG. 1, a packet 10 that flows in the network is structured into two parts: an information data field 2 and a header 4. The header is used by the communication protocol to assist in packet processing. The header has various bits of which only the following are relevant for this invention.

RQS/RSP bit—This bit is used to indicate whether the packet is a data request (RQS) or response (RSP) packet. The sender sets the RQS/RSP bit=ON for every packet that carries user information. When the RQS/RSP is ON, this bit shall be referred to as a request bit or an RQS bit. The receiver sets the RQS/RSP bit=OFF to indicate acknowledgment of having received the request. When the RQS/RSP bit is OFF, this bit shall be referred to as a pacing response bit or an RSP bit.

Pacing bit—The sender will set the pacing bit=ON every time it starts a new window. The receiver sets the pacing bit=ON when it sends a RSP bit (response) back to the sender with a new window size.

PRQ/PRS—These packets are identified by a combination of the RQS/RSP and pacing bits.

PRQ—This is a request packet (also referred to as the pacing request) that uses the first packet of a window and therefore the pacing bit and the RQS/RSP bit are set to ON.

PRS—This is a response packet that is used for the flow control algorithm, and therefore, the pacing bit is set. In the information field, the PRS packet has unique information containing the new window size to be used by the sender.

WR (window received) is a bit in each packet's header which is set by the sender in the first packet following the arrival of a pacing response (PRS). This packet will carry the WR=on. In other words, a WR "acknowledges" the receipt of a PRS by the sender.

The new dynamic window adjustment scheme of this invention is a unique way to find the best window size in one iteration for whatever the change in the window size should be. Windows are not reduced incrementally. Instead, the scheme accurately estimates the best window reduction amount and "converges" in one iteration. When increasing windows, the scheme may "overshoot," but this will be corrected in the next iteration.

If a session receives a new window before it exhausts a previous window, the session must have had been too large a window because its packets are not being transmitted fast enough by the sender. Similarly, if packets of a later window catch up with the packets of a previous window at the receiver, the window size is too large because the receiver cannot forward the packets fast enough. Essentially, the desirable window size should be based on two quantities: a) the slower of the transmitting or receiving rates and b) the window turn around time (i.e., the elapsed time between a PRQ departing and a subsequent PRS arriving at the sender).

In the receiver:

CNT—Count is the number of packets that arrive at a node in the interval between a PRQ arrival and the WR packet arrival. CNT thus samples the packet arrival rate during the time of one "round trip delay".

QL—Queue length is the number of packets in the transmission queue.

At the receiver, CNT and QL are incremented for each arriving packet and QL is decremented for each departing forwarded packet.

In the sender:

WW—WW is the working window size, which is the number of packets that the sender is permitted to transmit. WW is reduced by one for every departure and will increase by the window size (WS) when receiving a PRS.

NW—NW is the size of the next window permitted. NW will be updated by the new window value indicated in every new arrival of a PRS. The value of NW is the last value of WS which was calculated using equation 1 or 2, depending on whether QL is greater than or equal to zero and on whether the pacing bit is ON.

LWR—LWR is a flag used to indicate that no data packet has been transmitted since the last pacing response (PRS) arrival.

The Algorithm at the Receiver End

Figure 2:
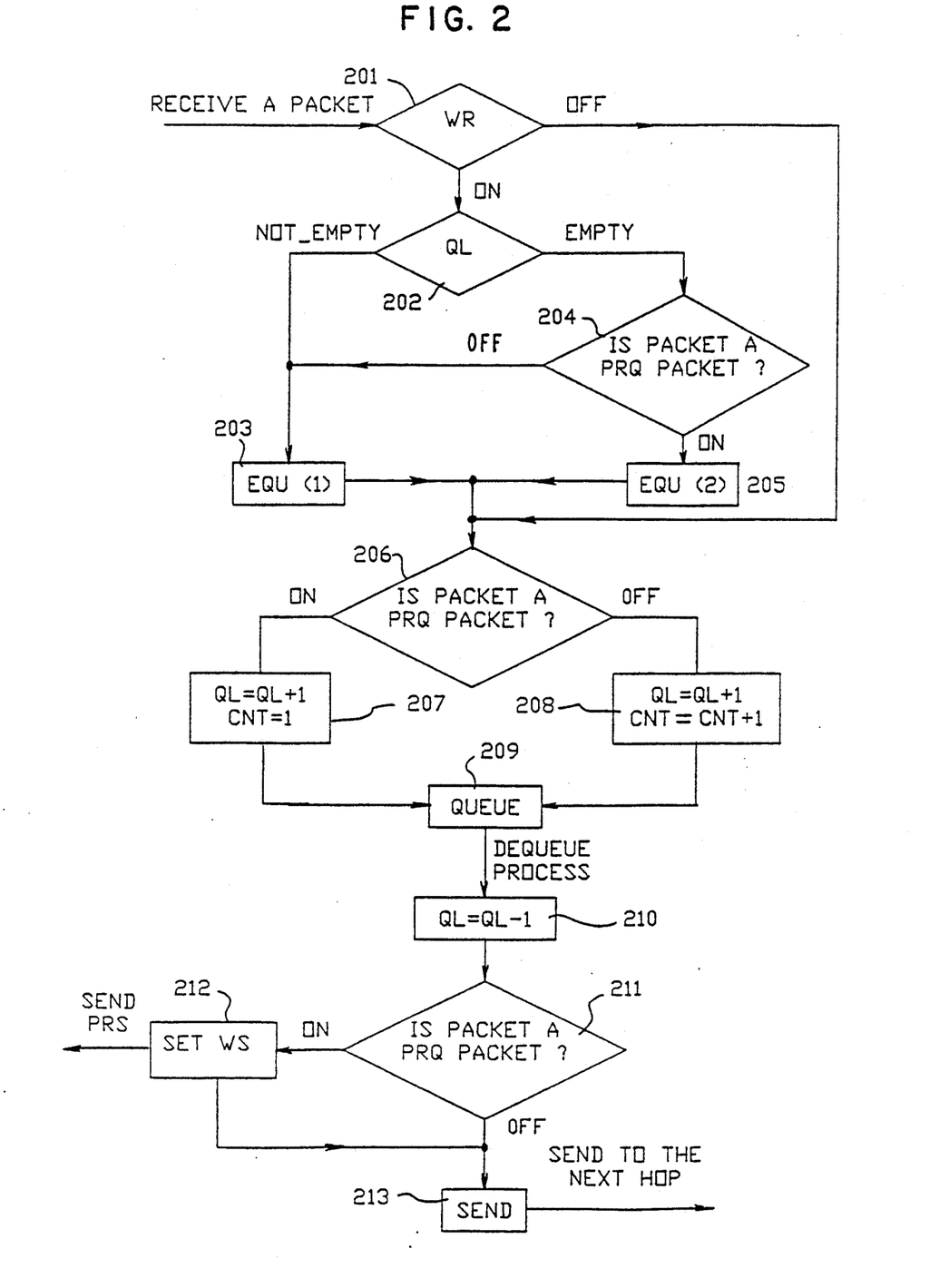
FIG. 2 is a flow chart of the algorithm used in this invention for the receiver.

The algorithm has two parts. The first part is processed before the packet is queued for the next hop, and the second is processed when the sender dequeues a packet in order to transmit on the next hop. FIG. 2 shows the flow diagram for the algorithm, and below is a detailed description of the various aspects of the scheme.

Part 1

Referring to FIG. 2, the first part starts at box 201 and ends at box 209. Upon arrival of a packet at node (201), the receivers check the WR bit in the header. If this bit is not set, then there is no need to adjust the window size, and therefore, the packet goes directly to box 206 to update local parameters. However, if the WR bit is set, then the correct window size for the next request must be computed. It may happen that the result is the same value as for the previous window size. In box 202, QL is checked. If the QL is not zero, then the conclusion is that the previous window was too big. The receiver computes a new reduced window size (WS) in box 203 as follows:

$$WS = \max(W_{min}, CNT - QL + B) \quad \text{Equation (1)}$$

where $W_{min}$ is a prespecified parameter representing the minimum window size and B is a design parameter representing a damping factor. $W_{min}$ is chosen so as to keep the flow control overhead within acceptable levels. Non-zero B is used to prevent possible over-reaction. Both of the values, $W_{min}$ and B, are tunable parameters and used for practical reasons. For example, $W_{min}$ and B can be 10 and 2, respectively, so that there is at most one control packet (e.g., PRS packet) for every 10 data packets.

When the queue is empty (202) the pacing bit is checked (204). If no pacing request is indicated by the pacing bit, then the sender has a bigger window than it can handle, and the receiver again computes a new reduced window in box 203.

So far, the method of decrementing the window size was described. The intent here is to provide a window size that matches the packet departure rate, but allows a certain number of packets B, to queue up at the receiving node. The following observations should help to clarify the schemes:

If the subsequent hop is not a bottleneck then one would expect QL to be close to B and thus the window size (as indicated by CNT) nearly matches the round trip delay of the hop under consideration, thus keeping the "pipe full".

When the subsequent hop becomes a bottleneck, QL grows large so that new_window is reduced towards $W_{min}$.

If the session is mostly inactive, the new_window need increase beyond $W_{min}$.

Normally, the window oscillates somewhat, and parameter B determines a delay/throughput trade-off and affects buffer utilization in the node.

In box 204, in the case where the queue is empty and the pacing bit is set, the receiver can afford to increase its transmission rate, and the sender indeed requests a larger window. In such case, the window size (WS) is increased to the following (205):

$$WS = \min(W_{max}, CNT + \alpha W_{max}) \quad \text{Equation (2)}$$

where $0 \leq \alpha \leq 1$ is a design parameter between zero and one.

Since the receiver has no information about the future traffic on the session, it must "guess" a new window that is between CNT and $W_{max}$. But the scheme is not sensitive to an over-estimate because the window reduction in equation (1) will always quickly correct any over-reaction. Therefore, almost any heuristic that aggressively increments the window from size CNT towards size $W_{max}$ will quickly "converge". Equation (2) should be viewed only as an example.

For any incoming packet, the receiver has to increase the queue size. However, the CNT is increased for every incoming packet until it is reset. It is reset when the pacing bit is set. Thus, for any incoming packet, if the pacing bit is ON, the CNT will be set to one (206, 207); however, if the pacing bit is OFF, the CNT will be incremented by one (206, 208). After either step 207 or 208 the incoming packet flows into the queue.

Part 2

All the packets that are in the outgoing queue are under the responsibility of the sender protocol. However, the receiver makes sure that for every packet that leaves the queue, it updates QL (210) and checks for the pacing bit (211). If the pacing bit is set, then it is the responsibility of the receiver to create a PRS (pacing response) packet with the window size from WS and send it back to sender of his own hop (box 212).

It may happen that the new_window size computed by the above procedure exceeds the number of available "uncommitted" packet buffers at the receiver. In this case, to avoid over commitment of receive packet buffers, the receiver transmits an extended pacing response (PRS) that contains two numbers: the number of available, "uncommitted" packet buffers (which is less than WS) and the "ideal" new_window size (WS) computed by the above procedure. The non-extended PRS packet has a data filed for only one number. When the sender obtains such an extended PRS, it can, of course, use the available, uncommitted number as the "next window" for the relevant session. But the sender can also increase the "next window" up to the value of the ideal new_window number by subtracting a like number of pacing credits from the Shared Credit Pool (SCP) which will be described below.

The Algorithm at the Sender

Figure 3:
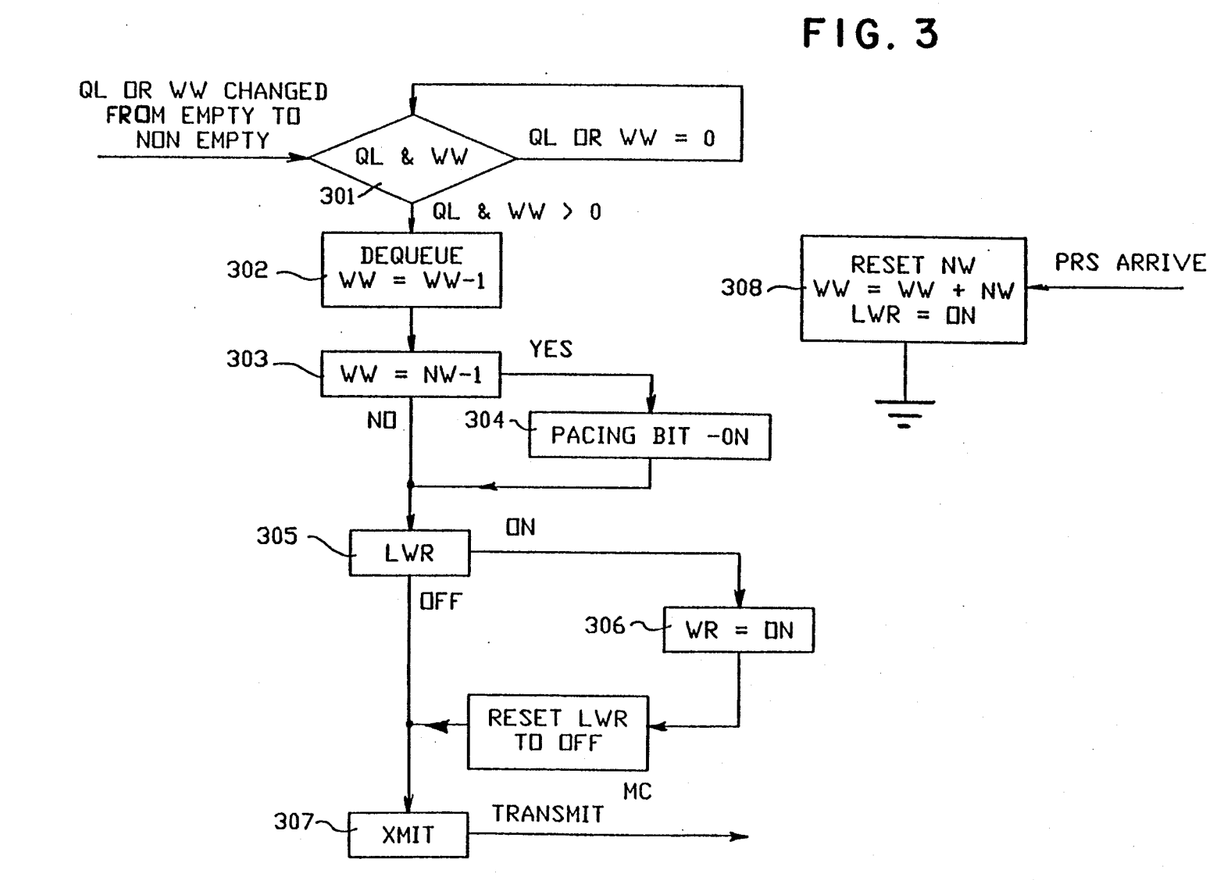
FIG. 3 is a flow chart for the algorithm used in this invention for the sender.

Referring to FIG. 3, the sender flow control algorithm can be triggered by two independent events. Either the queue has packets to send (301-307) or a PRS arrived from the receiver (308). The process of sending a packet requires permission from receiver in the form of a WW>0. This permission is checked in box 301. If the WW is greater than zero, then the sender dequeues the packet and reduces the working window size by one (302).

The reduced working window size is then compared with the value of the last window size received from the pacing response (303). If this working window size is one less than the last value of WS received from the pacing response, then the pacing bit is set to ON (304). Then, the LWR flag is checked (305). If this flag is set to ON, then the WR bit in the packet which was just dequeued is set to ON (306). As explained above, setting the LWR flag to ON indicates that no data packet has been transmitted since the last pacing response arrived at the sender. Finally, the dequeued packet (302) is transmitted to the receiver (307). Independent of the queue length or the window size, the sender may receive a PRS. Processing the PRS is shown in box 308. Resetting the NW means that the PRS has a new value for NW. It is part of the information as seen in FIG. 1.

SHARED CREDIT POOL

Figure 4:
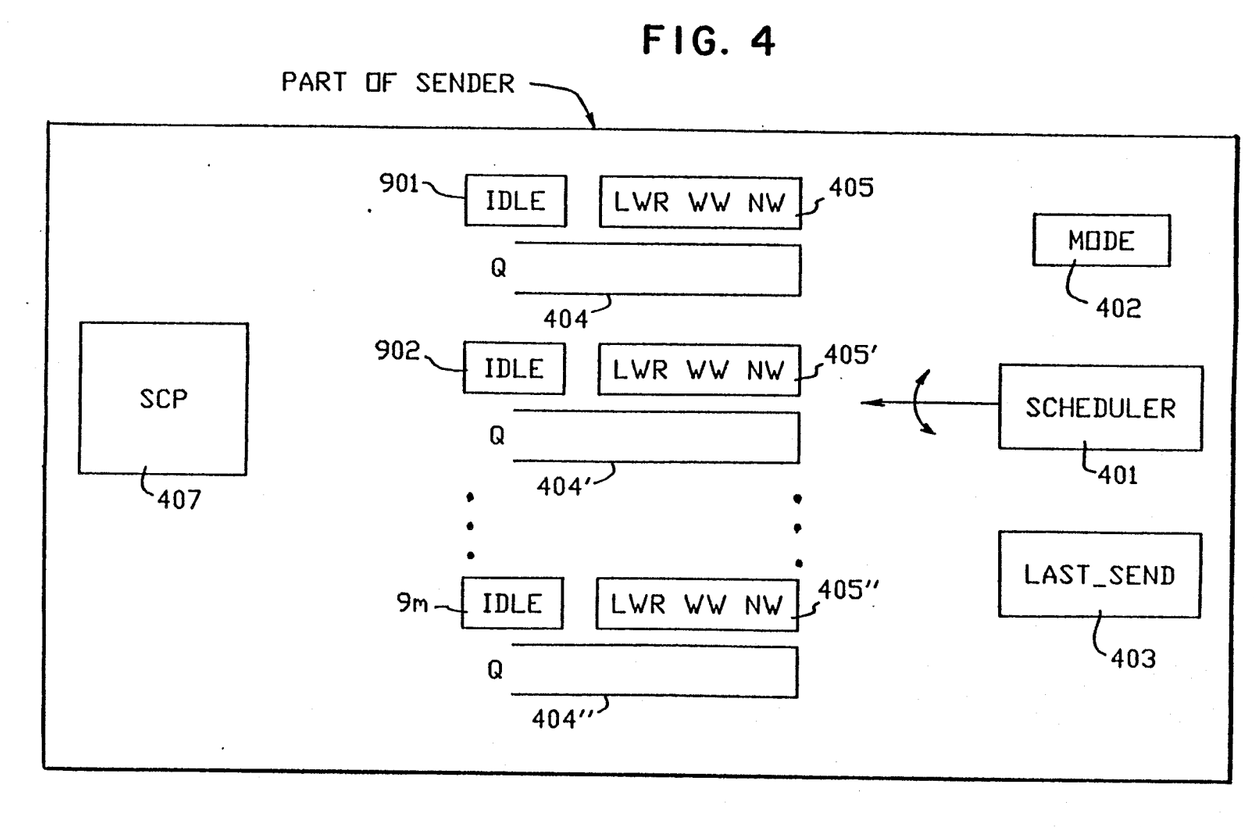
FIG. 4 schematically illustrates the structure of a sender with the shared credit pool.
Figure 7:
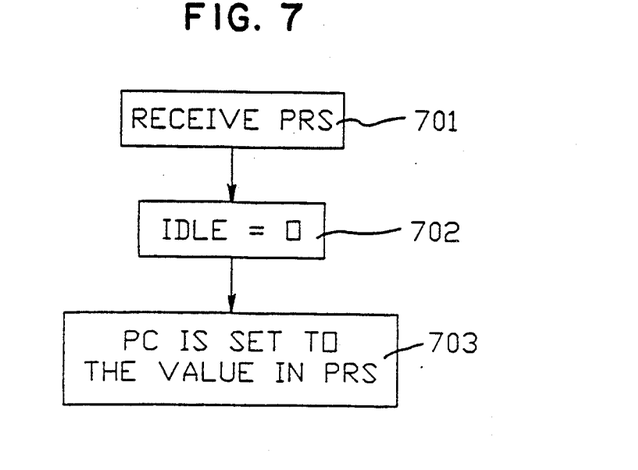
FIG. 7 illustrates the setting of the idle bit and pacing count upon a reception of a pacing response by a sender.

FIG. 4 shows the structure of a sender with the Shared Credit Pool (SCP). Each session maintains a send queue (404, 404', 404''), bits for indicating LWR, WW and NW (405, 405', 405''), and an IDLE bit (406, 406', 406''). Depicted in FIG. 7 are sessions 901, 902, . . ., 9n.

An ON IDLE bit of a session is used to indicate that the session was idle, i.e., had an empty send queue. There is one scheduler 401, which follows a certain discipline and decides the ordering of transmissions among sessions. There are two scheduling modes: exclusive and share. The scheduler also needs a register, Last-send 403, to set the scheduling modes.

Figure 5:
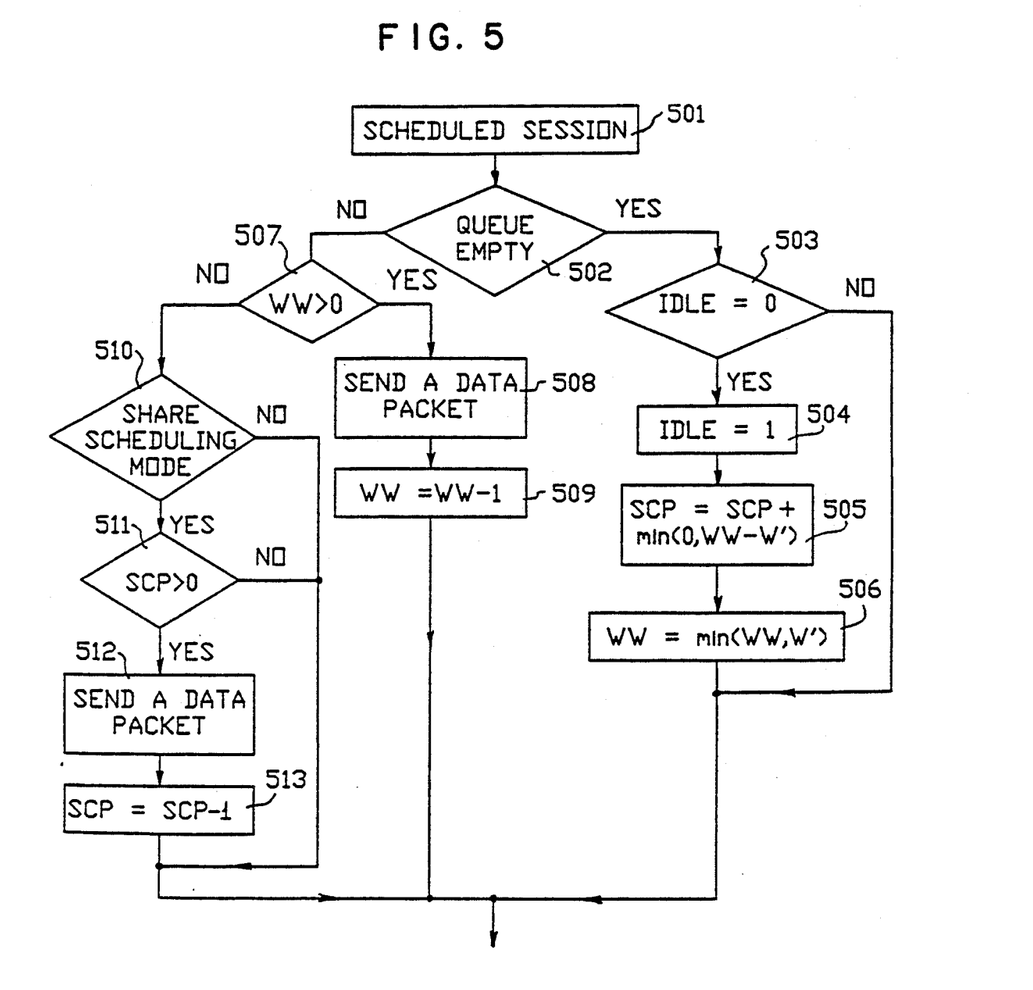
FIG. 5 schematically illustrates the process whereby the sender either sends a packet or collects pacing counts.

FIG. 5 shows the process that the sender either sends a packet for or collects pacing counts from a scheduler session. The process starts with a selected session, as in block 501. The process is conditioned on whether or not the session has an empty queue, as in block 502. If the queue is empty and the session's IDLE bit is not set (503), then the IDLE bit is set (504) and the session's pacing count in excess of W' is sent to shared credit pool (505 and 506). If the queue is not empty and the session has non-zero pacing count (507), a data packet is sent using one of the session's own pacing count (508 and 509). If the session has no private pacing count, it can use a pacing count from SCP if the scheduling is in share mode (510, 511, 512 and 513). W' is a system parameter and is recommended to have a value of $$W = \min\left(W_{max}, \frac{\text{total receive buffers}}{2 \times \text{no. of sessions}}\right).$$

This process is repeated indefinitely on every session scheduled.

Figure 6:
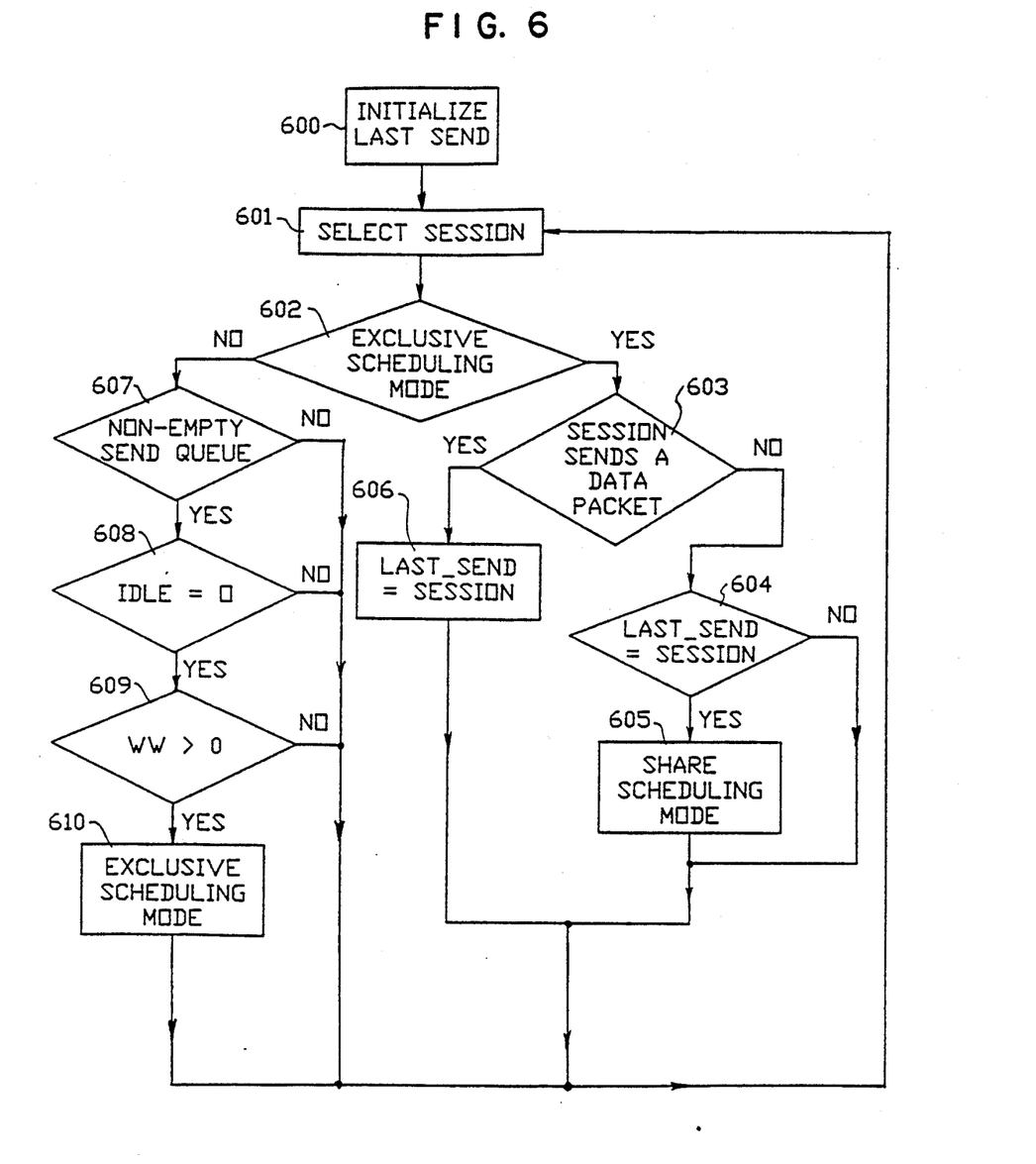
FIG. 6 is a flow chart illustrating the process of transition between the share and exclusive scheduling modes.

FIG. 6 shows the process of changing the scheduling mode. There are two scheduling modes: share and exclusive. In exclusive mode, a session must use its own pacing count to send data packets. In share mode, sessions with IDLE=1 can use pacing counts from the SCP to send data packets. The process starts with some initialization of Last-send (600) and a currently selected session (601), and is conditioned on the current scheduling mode (602). If the scheduling is in exclusive mode, the process is dependent on whether or not the selected session sends a data packet (603). If the session sends a data packet, the mode is not changed and Last-send is updated to record the selected session, as in 606. If the session does not send any data packet, the fact that Last-send=session (604) indicates that no session sends any data packet between two consecutive schedulings of the selected session. This is the situation where no session can use their own pacing counts to send data packets. The scheduling mode is then switched to share mode 605.

The scheduling is switched from share mode to exclusive mode as soon as one session can send a data packet using its own pacing count. Hence, given the scheduling is in share mode, if the selected session has (1) non-empty send queue (607), (2) IDLE set of OFF (608), and (3) non-zero pacing counts (609), the scheduling is changed to exclusive mode (610).

Sessions with IDLE=0 use pacing counts from the SCP to send data packets in share scheduling mode until they get new windows, i.e., when they receive new PRS's. Hence, the IDLE bit is reset to 0 upon arrival of the PRS. FIG. 7 shows the process of resetting IDLE bit. The process is triggered when a session receives a PRS (701). Then, IDLE is set to OFF (702) and PC is set to the value specified in PRS (703).

Figure 8:
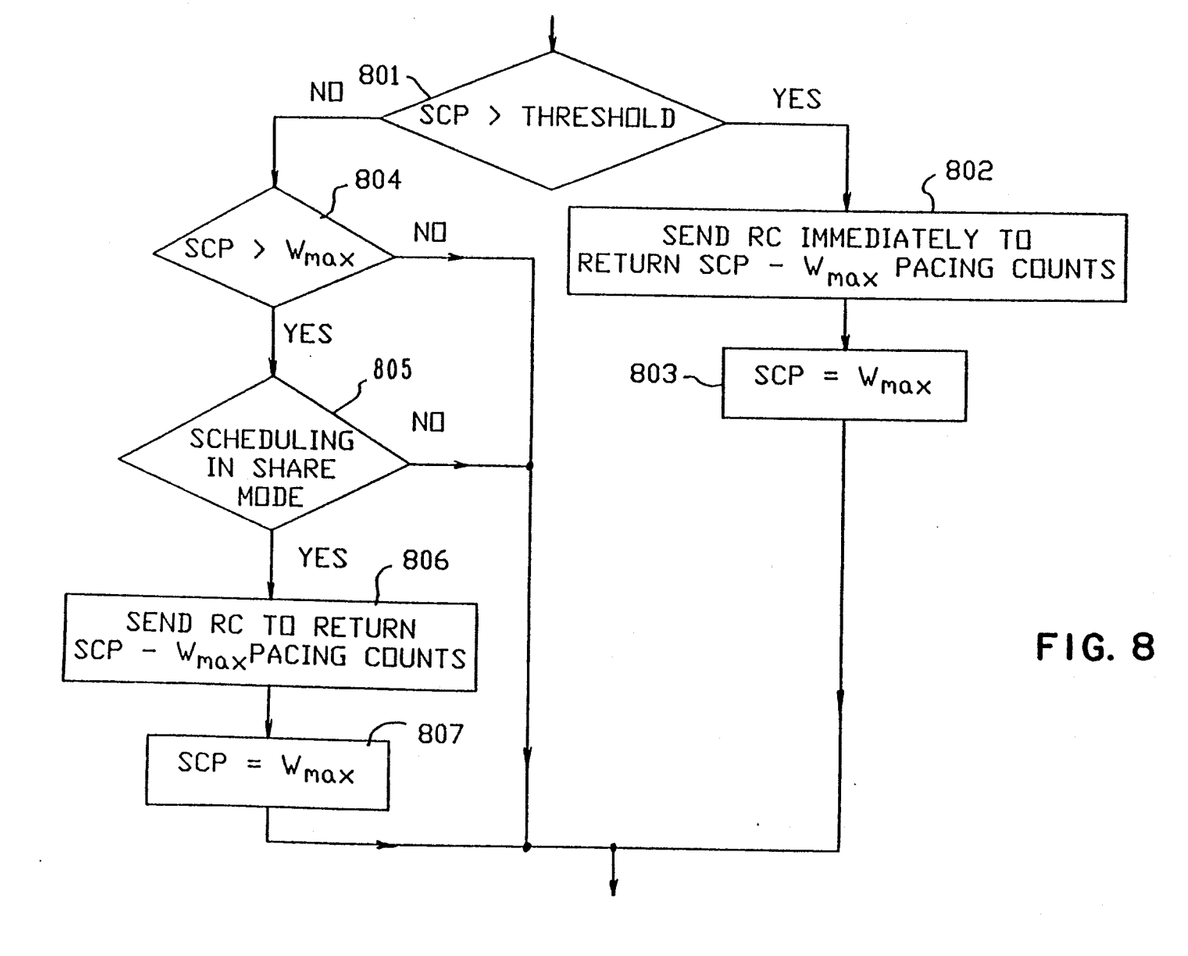
FIG. 8 is a flow chart illustrating the process of returning pacing credits from the shared credit pool when the pacing counts in the pool become too large.

Pacing counts in the SCP should not get too large; otherwise, the receiver looses control of its receiving buffers. An isolated pacing message (IPM) called Return Credit (or simply RC) is devised for this procedure. The sender usually sends RC's at convenient time such as when the scheduling is in share mode. However, if the pacing count in the SCP exceeds a prespecified threshold, then the return of the pacing credits is expedited. With either way of returning pacing counts, it is desirable to maintain some amount of pacing counts in SCP. A recommended value is $W_{max}$. FIG. 8 shows this process, in which the convenient time is when the scheduling is in share mode. The process is conditioned on whether SCP has accumulated more pacing counts than the threshold or not (801). If yes, the return is expedited by sending RC with (SCP−$W_{max}$) pacing counts immediately (802) and resetting the SCP to $W_{max}$ (803). If the threshold is not exceeded, an RC with (SCP−$W_{max}$) pacing counts is sent only if (1) the SCP has more pacing counts than $W_{max}$ and (2) the time is convenient, i.e., scheduling is in share mode (805). Also, when the RC is sent under the latter two conditions, the SCP is reset to $W_{max}$ (see 807). This process is activated whenever pacing counts are added to the SCP or the time is convenient such as in share scheduling mode.

Having thus described our invention, what we claim as new and desire to secure by Letters Patents is:

1. In a packet transmission network, a method of adjusting the window size in a session between a sender and a receiver on a link of said network, said method comprising:

transmitting a pacing response to said sender indicating the size of a subsequent window to be transmitted in a session between said sender and said receiver, said size of said subsequent window being a number of packets that said sender can transmit in a subsequent window, said subsequent window size (WS) being determined by decreasing a previous window size if when said window size is to be calculated, either QL≠0, or QL=0 and a pacing request was not received within a specified time interval, said window size thus being determined according to the following formula:

$$WS = \max(W_{min}, CNT - QL + B),$$

where CNT is the number of packets received by said receiver from said sender during a round trip delay which is the time needed for a first packet to be transmitted from said sender to said receiver plus the time needed for a second packet to be transmitted from said receiver to said sender after said first packet is received by said receiver, where QL is the number of packets stored in a queue of said receiver for future transmission to another node of said network, where $W_{min}$ is a prespecified parameter denoting a minimum window size, and where B is also a prespecified parameter, said subsequent window size being determined by increasing a previous window size if when said subsequent window size is to be calculated, QL=0 and a pacing request was received in said specified time interval, said subsequent window size thus assuming a value between CNT and $W_{max}$, where $W_{max}$ is a prespecified parameter.

2. In a packet transmission network, a method of adjusting a window size in a session between a sender and a receiver on a link of said network, said method comprising:

transmitting a pacing request to said receiver indicating a request for a subsequent window size for a subsequent window, said subsequent window size being a number of packets that said sender can transmit in said subsequent window of said session; and transmitting, in response to said pacing request, a pacing response to said sender indicating the size of said subsequent window to be transmitted in said session between said sender and said receiver, said subsequent window size being determined by decreasing a previous window size if when said subsequent window size (WS) is to be calculated, either QL≠0, or QL=0 and a pacing request was not received in a specified time interval, said subsequent window size thus being determined according to the following formula: $WS = \max(W_{min}, CNT - QL + B)$, where CNT is the number of packets received by said receiver from said sender during a round trip delay which is the time needed for a first packet to be transmitted to said sender to said receiver plus the time needed for a second packet to be transmitted from said receiver to said sender after said first packet is received by said receiver, where QL is the number of packets stored in a queue of said receiver future transmission to another node of said network, where Wmin is a prespecified parameter denoting a minimum window size, and where B is also a prespecified parameter, said subsequent window size being determined by increasing a previous window size if when said subsequent window size is to be calculated, QL=0 and a pacing request was received in said specified time interval, said subsequent window size assuming a value between CNT and $W_{max}$, where $W_{max}$ is a prespecified parameter.

3. In a packet transmission network, a method of adjusting a window size in a session between a sender and a receiver of a link of said network, said method comprising:

transmitting, while a first window is being transmitted, a pacing response to said sender indicating a size of a second window to be transmitted in a session between said sender and said receiver, said second window being the window transmitted in said session after the transmission of said first window in said session without any other window being transmitted in the time between the transmission of said first and second windows, said size of said second window being a number a packets that said sender can transmit in said second window, said size of said second window being determined by decreasing a window size of said first window if, when said size of second window is to be calculated, either QL≠0, or QL=0 and a pacing request was not received by said receiver in a specified time interval, said subsequent window size thus being determined according to the following formula:

$WS$(window size)$=\max(W_{min}, CNT-QL+B)$, where CNT is the number of packets received by said receiver from said sender during a round trip delay which is the time needed for a first packet to be transmitted from said receiver to said sender plus the time needed for a second packet to be transmitted from said sender to said receiver after said first packet is received by said sender, where QL is the number of packets stored in a transmission queue of said receiver, where $W_{min}$ is a prespecified parameter denoting a minimum window size, and where B is also a prespecified parameter, said window size of said second window being determined by increasing a size of said first window if when said size of said second window is to be calculated, QL=0 and a pacing request was received by said receiver in said specified time interval, said size of said second window thus assuming a value between CNT and $W_{max}$ where $W_{max}$ is a prespecified parameter.

4. In a packet transmission network, a method of adjusting the window size in a session between a sender and a receiver of a link of said network, said method comprising:

transmitting, in a first window, a pacing request to said receiver indicating a request for a window size for a second window, said window size being a number of packets that said sender can transmit in said second window of said session; and transmitting, while a first window is being transmitted and in response to said pacing request, a pacing response to said sender indicating said window size of said second window to be transmitted in a session between said sender and said receiver, said second window being the window transmitted in said session after the transmission of said first window in said session without any other windows being transmitted in the time between the transmission of said first and second windows, said window size of said second window being a number of packets that said sender can transmit in said second window, said window size of said second window being determined by decreasing a window size of said first window if, when said window size of said second window is to be calculated, either QL≠0, or QL=0 and said pacing request was not received by said receiver in a specified time interval, said window size thus being determined according to the following formula: $WS$ (window size)$=\max(W_{min}, CNT-QL+B)$, where CNT is the number of packets received by said receiver from said sender during a round trip delay which is the time needed for a first packet to be transmitted from said receiver to said sender plus the time needed for a second packet to be transmitted from said sender to said receiver after said first packet is received by said sender, where QL is the number of packets stored in a transmission queue of said receiver, where $W_{min}$ is a prespecificed parameter denoting a minimum window size, and where B is also a prespecified parameter, said size of said second window determined by increasing a size of said first window, if when said size of said second window is to be calculated, QL=0 and a pacing request was received by said receiver in said specified time interval, said size of said second window thus assuming a value between CNT and $W_{max}$ where $W_{max}$ is a prespecified parameter.

5. In a packet transmission network, a method of adjusting the window size in a session between a sender and a receiver of a link of said network, said method comprising:

transmitting pacing requests to said receiver, each of said pacing requests being at least a bit in a packet indicating a request for a window size for a respective window immediately following a window containing a respective one of said pacing requests;

transmitting pacing responses to said sender, each of said pacing responses being in response to a respective one of said pacing requests, each pacing response being at least a bit in a packet indicating a window size for respective window immediately following a window containing each pacing request;

transmitting acknowledgement bits to said receiver from said sender, each of said acknowledgement bits being transmitted in the next packet immediately following the reception of a respective one of said pacing responses by said sender, each acknowledgement bit indicating the reception of a respective pacing response of said pacing responses;

determining window sizes upon reception of said acknowledgement bits, each window size being determined upon each reception of one of said acknowledgement bits, each window size to be included in one of said pacing responses which is to be the next pacing response transmitted to said sender after each reception of one of said acknowledgement bits, each said window size being determined using the following formula: $WS$(windowsize) = max($W_{min}$, $CNT-QL+B$) if $QL \neq 0$, or if $QL=0$ and a last packet received by said receiver does not contain one of said pacing requests, otherwise, each said window size being determined to assume a value between CNT and $W_{max}$ where, for each determination of each of said window sizes, QL is the number of packets stored in a queue of said receiver when a corresponding one of said acknowledgement bits is received but before a packet containing said corresponding acknowledgement bit is stored in said queue, where CNT is the number of packets transmitted from said sender to said receiver during the interval between the reception of said corresponding acknowledgement bit and the reception of a last one said pacing requests that is received prior to said corresponding acknowledgement bit, where $W_{max}$ and $W_{min}$ are respectively, prespecified maximum and minimum window size that can be used in said session, and where B is a prespecified constant.

6. An apparatus for adjusting a window size in a session between a sender and a receiver communicating over a link of a packet communications network, said apparatus comprising:

transmitting means for transmitting a pacing response to said sender indicating the size of a subsequent window to be transmitted in a session between said sender and said receiver, said size of said subsequent window being a number of packets that said sender can transmit in a subsequent window; and determining means for determining said subsequent window size (WS) wherein said subsequent window size is determined by decreasing a previous window size if when said window size is to be calculated, either $QL \neq 0$, or $QL=0$ and a pacing request was not received in a specified time interval, then said subsequent window size being a size decreased from said previous window size according to the following formula: $WS = $ Max $W_{min}$, $CNT-QL+B$), where CNT is the number of packets received by said receiver from said sender during a round trip delay which is the time needed for a first packet to be transmitted from said sender to said receiver plus the time needed for a second packet to be transmitted from said receiver to said sender after said first packet is received by said receiver, where QL is the number of packets stored in a queue of said receiver for future transmission to another node of said network, where $W_{min}$ is a prespecified parameter denoting a minimum window size, and where B is also a prespecified parameter, and wherein said subsequent window size is determined by increasing said previous window size if when said window size is to be calculated, $QL=0$ and a pacing request was received in said specified time interval, said subsequent window size thus assuming a value between CNT and $W_{max}$, where $W_{max}$ is a prespecified parameter.

7. An apparatus for adjusting a window size in a session between a sender and a receiver communicating over a link of a packet communications network, said apparatus comprising:

means for transmitting a pacing request to said receiver indicating a request for a subsequent window size, said subsequent window size being a number of packets that said sender can transmit in a subsequent window in said session;

means for transmitting, in response to said pacing request, a pacing response to said sender indicating the size of subsequent window to be transmitted in said session between said sender and said receiver; and means for determining said subsequent window size (WS) wherein said subsequent window size is determined by decreasing a previous window size if when said window size is to be calculated, either $QL \neq 0$, or $QL=0$ and a pacing request was not received in a specified time interval, said window size then being decreased according to the following formula: $WS = $ max($W_{min}$, $CNT-QL+B$), where CNT is the number of packets received by said receiver from said sender during a round trip delay which is the time needed for a first packet to be transmitted to said sender to said receiver plus the time needed for a second packet to be transmitted from said receiver to said sender after said first packet is received by said receiver, where QL is the number of packets stored in a queue of said receiver for future transmission to another node of said network, where $W_{min}$ is a prespecified parameter denoting a minimum window size, and where B is also a prespecified parameter, and wherein said subsequent window is determined by increasing said previous window size if when said window size is to be calculated, $QL=0$ and a pacing request was received in said specified time interval, said subsequent window size being increased from said previous value to assume a value between CNT and $W_{max}$, where $W_{max}$ is a prespecified parameter.

8. An apparatus for adjusting a window size in a session between a sender and a receiver communicating over a link of a packet communications network, said apparatus comprising:

means for transmitting, in a first window, a pacing request to said receiver indicating a request for a window size for a second window, said window size being a number of packets that said sender can transmit in said second window of said session;

means for transmitting, while a first window is being transmitted and in response to said pacing request, a pacing response to said sender indicating the size of said second window to be transmitted in said session between said sender and said receiver, said second window being a window transmitted in said session after the transmission of said first window in said session without any other windows being transmitted in the time between the transmission of said first and second windows, said size of said second window being a number of packets that said sender can transmit in said second window; and means for determining said size of said second window wherein said second window size is determined by decreasing a window size of said first window if, when said size of said second window is to be calculated, either Q≠0, or QL=0 and said pacing request was not received by said receiver in a specified time interval, said first window size then being decreased to said second window size according to the following formula:

$$WS(\text{windowsize}) = \max(W_{min}, CNT - QL + B),$$

where CNT is the number of packets received by said receiver from said sender during a round trip delay which is the time needed for a first packet to be transmitted from said receiver to said sender plus the time needed for a second packet to be transmitted from said sender to said receiver after said first packet is received by said sender, where QL is the number of packets stored in a transmission queue of said receiver, where $W_{min}$ is a prespecified parameter denoting a minimum window size, and wherein said size of said second window is determined by increasing from a window size of said first window, if when said size of said second window is to be calculated, QL=0 and a pacing request was received by said receiver in said specified interval, said size of said second window being increased to assume a value between CNT and $W_{max}$ where $W_{min}$ is a prespecified parameter.

9. An apparatus for adjusting a window size in a session between a sender and a receiver communicating over a link of a packet communications network, said apparatus comprising:

means for transmitting pacing requests to said receiver, each of said pacing requests being at least a bit in a packet indicating a request for a window size for a respective window immediately following a window containing each pacing request;

means for transmitting pacing responses to said sender, each of said pacing responses being in response to a respective one of said pacing requests, each pacing response being at least a bit in a packet indicating a window size for respective window immediately following a window containing a respective one of said pacing requests;

means for transmitting acknowledgement bits to said receiver from said sender, each of said acknowledgement bits being transmitted in the next packet immediately following the reception of a respective one of said pacing responses by said sender, each acknowledgement bit indicating the reception of a respective pacing response of said pacing responses;

means for determining window sizes upon reception of said acknowledgement bits, each window size being determined upon each reception of one of said acknowledgement bits, each window size to be included in one of said pacing responses which is to be the next pacing response transmitted to said sender after each reception of one of said acknowledgement bits, each said window size being determined using the following formula: $WS(\text{window size}) = \text{Max} W_{min}, CNT - QL + B)$ if QL≠0, or if QL=0 and a last packet received by said receiver does not contain one of said pacing requests, otherwise, each said window size being determined to assume a value between CNT and $W_{max}$ where, for each determination of each of said window sizes, QL is the number of packets stored in a queue of said receiver when a corresponding one of said acknowledgement bits is received but before a packet containing said corresponding acknowledgement bit is stored in said queue, where CNT is the number of packets transmitted from said sender to said receiver during the interval between the reception of said corresponding acknowledgement bit and the reception of a last one said pacing requests that is received prior to said corresponding acknowledgement bit, where $W_{max}$ and $W_{min}$ are respectively, prespecified maximum and minimum window sizes that can be used in said session, and where B is a prespecified constant.

10. In a packet transmission network, a method of sharing pacing credits among selected sessions of a plurality of sessions during which packets are to be transmitted, said method comprising:

polling each of said sessions to determine if a send queue corresponding to said each session has packets stored therein for transmission;

storing, for each of said selected sessions, at least one pacing credit in a shared credit pool if a send queue corresponding to said each selected session has no packets stored therein for transmission when said each selected session is polled; and distributing pacing credits stored in said shared credit pool to those of said selected sessions whose corresponding send queues have packets stored therein for transmission.

11. A method as recited in claim 10 wherein, for each of said selected sessions, pacing credits are stored in said shared credit pool only if the pacing count for each selected session is greater the W', a first selected value.

12. A method as recited in claim 10 wherein, for each of said selected sessions, pacing credits stored in said shared credit pool are distributed to said each selected session only if said each selected session has a pacing count which is less than a second selected value.

13. A method as recited in claim 10, wherein each of said sessions may assume either of two modes, one of said modes being an exclusive scheduling mode in which pacing credits are neither distributed from nor sent to said shared credit pool, the other of said modes being a share scheduling mode in which pacing credits can be sent to or distributed from said shared credit pool, said method having at least one of said sessions in the shared scheduling mode, said sessions in said share scheduling mode being said selected session.

14. A method as recited in claim 13 wherein a first session of said sessions in said exclusive scheduling mode will change to said share scheduling mode when no one of said sessions transmits any packets during the time between two consecutive scheduling of said first session and during the time of the latter scheduling of said first session, and wherein any second session of said sessions will change from said share mode to said exclusive mode as soon as said second session can transmit a packet without receiving pacing credits distributed from the shared credit pool.

15. In a packet transmission network, an apparatus for sharing pacing credits among selected sessions of a plurality of sessions during which packets are to be transmitted, said method comprising:

means for polling each of said sessions to determine if a send queue corresponding to said each session has packets stored therein for transmission;

means for storing, for each of said selected sessions, at least one pacing credit in a shared credit pool if a send queue corresponding to said each selected session has no packets stored therein for transmission when said each selected session is polled; and means for distributing pacing credits stored in said shared credit pool to those of said selected sessions whose corresponding send queues have packets stored therein for transmission.

* * * * *